US009681382B2

(12) United States Patent
Zhang et al.

(10) Patent No.: US 9,681,382 B2
(45) Date of Patent: Jun. 13, 2017

(54) RADIO COEXISTENCE IN WIRELESS NETWORKS

(71) Applicant: INTEL CORPORATION, Santa Clara, CA (US)

(72) Inventors: Yujian Zhang, Beijing (CN); Mo-Han Fong, Sunnyvale, CA (US); Youn Hyoung Heo, Seoul (KR); Ali Koc, Hillsboro, OR (US); Hong He, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/756,663

(22) Filed: Feb. 1, 2013

(65) Prior Publication Data

US 2013/0301420 A1 Nov. 14, 2013

Related U.S. Application Data

(60) Provisional application No. 61/646,223, filed on May 11, 2012.

(51) Int. Cl.
*H04W 52/02* (2009.01)
*H04B 7/26* (2006.01)
(Continued)

(52) U.S. Cl.
CPC .......... *H04W 52/0235* (2013.01); *H04B 1/56* (2013.01); *H04B 7/024* (2013.01);
(Continued)

(58) Field of Classification Search
CPC ....... H04W 24/02; H04W 24/10; H04W 4/22; H04W 76/048; H04W 24/00;
(Continued)

(56) References Cited

U.S. PATENT DOCUMENTS 8,780,880 B2 * 7/2014 Lin .................. H04W 72/1215
370/345
2009/0239466 A1 9/2009 Saitou
(Continued)

FOREIGN PATENT DOCUMENTS

CN 101637051 A 1/2010
CN 102415201 A 4/2012
(Continued)

OTHER PUBLICATIONS

International Search Report and Written Opinion received for PCT Patent Application No. PCT/US2013/040573, mailed on Aug. 22, 2013, 14 pages.
(Continued)

*Primary Examiner* — Michael Thier
*Assistant Examiner* — Rownak Islam
(74) *Attorney, Agent, or Firm* — Thorpe North & Western

(57) ABSTRACT

Technology for reducing coexistence interference in a multi-radio device is disclosed. One method comprises applying discontinuous reception (DRX) to a user equipment (UE) having a plurality of radio transceivers. The DRX can include a long DRX cycle for the UE. One of a 2 milliseconds (ms), 5 ms, and 8 ms cycle start offset period may be provided for the long DRX cycle to reduce coexistence interference between the plurality of radio transceivers in the UE. The cycle start offset period is selected to provide at least one Hybrid Automatic Repeat Request (HARQ) process reservation pattern to reduce the coexistence interference between the plurality of radio transceivers in the UE.

14 Claims, 9 Drawing Sheets

(51) Int. Cl.
| | |
|---|---|
| H04W 36/00 | (2009.01) |
| H04J 3/16 | (2006.01) |
| H04W 24/10 | (2009.01) |
| H04W 72/04 | (2009.01) |
| H04W 72/08 | (2009.01) |
| H04J 3/00 | (2006.01) |
| H04B 1/56 | (2006.01) |
| H04W 56/00 | (2009.01) |
| H04W 76/02 | (2009.01) |
| H04W 4/22 | (2009.01) |
| H04W 36/22 | (2009.01) |
| H04B 15/00 | (2006.01) |
| H04W 76/04 | (2009.01) |
| H04B 7/024 | (2017.01) |
| H04B 7/0456 | (2017.01) |
| H04B 7/06 | (2006.01) |
| H04W 24/02 | (2009.01) |
| H04W 72/12 | (2009.01) |
| H04L 29/02 | (2006.01) |
| H04W 4/00 | (2009.01) |
| H04W 4/06 | (2009.01) |
| H04W 48/20 | (2009.01) |
| H04W 16/14 | (2009.01) |
| H04B 7/04 | (2017.01) |
| H04L 29/06 | (2006.01) |
| H04W 4/02 | (2009.01) |
| H04J 3/26 | (2006.01) |
| H04L 27/26 | (2006.01) |
| H04W 72/10 | (2009.01) |
| H04L 5/00 | (2006.01) |
| H04L 5/14 | (2006.01) |
| H04W 36/32 | (2009.01) |
| H04W 4/16 | (2009.01) |
| H04W 36/04 | (2009.01) |
| H04W 36/16 | (2009.01) |
| H04W 72/00 | (2009.01) |
| H04B 7/0417 | (2017.01) |
| H04W 36/30 | (2009.01) |
| H04W 36/18 | (2009.01) |
| H04W 88/06 | (2009.01) |
| H04W 72/02 | (2009.01) |
| H04L 1/00 | (2006.01) |
| H04L 1/18 | (2006.01) |
| H04W 88/02 | (2009.01) |
| H04W 88/08 | (2009.01) |

(52) U.S. Cl.
CPC ......... *H04B 7/0417* (2013.01); *H04B 7/0456* (2013.01); *H04B 7/0473* (2013.01); *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/1694* (2013.01); *H04J 3/26* (2013.01); *H04L 5/001* (2013.01); *H04L 5/0007* (2013.01); *H04L 5/0035* (2013.01); *H04L 5/0096* (2013.01); *H04L 5/14* (2013.01); *H04L 5/1469* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/16* (2013.01); *H04W 4/22* (2013.01); *H04W 16/14* (2013.01); *H04W 24/02* (2013.01); *H04W 24/10* (2013.01); *H04W 36/00* (2013.01); *H04W 36/0055* (2013.01); *H04W 36/0061* (2013.01); *H04W 36/0088* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0209* (2013.01); *H04W 52/0212* (2013.01); *H04W 52/0216* (2013.01); *H04W 52/0225* (2013.01); *H04W 52/0229* (2013.01); *H04W 52/0251* (2013.01); *H04W 56/00* (2013.01); *H04W 56/001* (2013.01); *H04W 72/005* (2013.01); *H04W 72/042* (2013.01); *H04W 72/044* (2013.01); *H04W 72/048* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/12* (2013.01); *H04W 72/1215* (2013.01); *H04W 76/023* (2013.01); *H04W 76/027* (2013.01); *H04W 76/046* (2013.01); *H04W 76/048* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04W 4/02* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/06* (2013.01); *H04W 88/08* (2013.01); *Y02B 60/50* (2013.01)

(58) Field of Classification Search
CPC ...... H04W 36/30; H04W 88/02; H04B 15/00; H04B 7/26; H04B 7/0613; H04B 7/0697; H04B 7/0626; H04B 7/0632; H04J 3/1694; H04J 3/02; H04L 5/0078; H04L 1/1812; H04L 5/001; H04L 5/0053; H04L 1/1822
USPC ....... 370/329, 311, 328, 252, 241, 331, 280, 370/310, 310.2, 330, 345, 458, 498; 455/553.1, 450, 436, 501
See application file for complete search history.

(56) References Cited

U.S. PATENT DOCUMENTS

| | | | |
|---|---|---|---|
| 2010/0110897 A1* | 5/2010 | Chun | H04L 43/0811 370/241 |
| 2010/0322097 A1* | 12/2010 | Jen | 370/252 |
| 2011/0105069 A1 | 5/2011 | Gaal et al. | |
| 2011/0194551 A1 | 8/2011 | Lee et al. | |
| 2011/0217973 A1 | 9/2011 | Saagfors et al. | |
| 2011/0243047 A1* | 10/2011 | Dayal | H04W 72/1215 370/311 |
| 2012/0020229 A1* | 1/2012 | Dayal et al. | 370/252 |
| 2012/0040620 A1* | 2/2012 | Fu | H04B 1/1027 455/63.1 |
| 2012/0082077 A1 | 4/2012 | Zhang et al. | |
| 2012/0087341 A1 | 4/2012 | Jang | |
| 2012/0093012 A1* | 4/2012 | Pedersen | H04W 24/10 370/252 |
| 2012/0113843 A1 | 5/2012 | Watfa et al. | |
| 2012/0140743 A1* | 6/2012 | Pelletier | H04W 72/0453 370/335 |
| 2012/0155437 A1 | 6/2012 | Kuo | |
| 2012/0195291 A1 | 8/2012 | Kuo | |
| 2012/0207040 A1 | 8/2012 | Comsa et al. | |
| 2012/0250549 A1* | 10/2012 | Lee et al. | 370/252 |
| 2012/0257557 A1 | 10/2012 | Yamazaki | |
| 2012/0281563 A1* | 11/2012 | Comsa | H04W 24/10 370/252 |
| 2013/0083675 A1 | 4/2013 | Yamada | |

(56) References Cited

U.S. PATENT DOCUMENTS

| | | | |
|---|---|---|---|
| 2013/0122918 A1 | 5/2013 | Boley | |
| 2013/0208711 A1 | 8/2013 | Van Lieshout | |
| 2014/0198701 A1* | 7/2014 | Ostergaard et al. | 370/311 |

FOREIGN PATENT DOCUMENTS

| | | | |
|---|---|---|---|
| JP | 2011-004212 A | 6/2009 | |
| WO | WO 2011/123535 A1 | 10/2011 | |
| WO | 2012/061765 A1 | 5/2012 | |
| WO | WO 2012/057590 A2 | 5/2012 | |
| WO | 2012/099939 A1 | 7/2012 | |
| WO | 2013/170167 A1 | 11/2013 | |

OTHER PUBLICATIONS

LG Electronics Inc. SCell activation and CS, 3GPP TSG-RAN2 Meeting #72bis, RZ-110344, Dublin, Ireland (http://www.3gpp.org/ftp/ts~ran/WG2-RL2/TSGRZ_72bis/Docs/), 2 pages.

Renesas Mobile Europe Ltd, Considerations on Bluetooth and E-UTRAN coexistence, 3GPP TSG RAN WG2 Meeting #77, RZ-120572, Dresden, Germany (http://www.3gpp.org/ftp/ts~ran/WG2_RL2/TSGRZ_77/docs/), 2 pages.

Office Action received for Sweden Patent Application No. 1350583-9, mailed on May 28, 2014, 8 pages of Office Action only.

Search Report and Written Opinion received for Spanish Patent Application No. P201330674, mailed on Jun. 17, 2014 8 pages of Search Report and Written Opinion including 4 pages of English Translation.

Ericsson; Signaling of DRX Start Offset; TSG-RAN WG2 Meeting #63bis; R2-085387 (updated R2-084003); Sep. 23, 2008; 7 pages; Agenda Item 5.4.3; Prague, Czech republic.

Chinese patent application 201310294324.6; filing date May 10, 2013; Intel Corporation; office action Jan. 22, 2015.

Dutch patent application 2010786; filing date May 10, 2013; Intel Corporation; office action/search report Feb. 28, 2015.

Belgian patent application 2013/00336; Filing date May 13, 2013; Intel Corporation; office action/search report dated Feb. 10, 2015 (received Mar. 5, 2015).

Samsung et al. "Measurement for Mobility Purpose During In-Device Interference", 3GPP TSG-RAN WG2 R2-121473, Discussion and Decision, Mar. 2012, Meeting 77bis, Agenda 7.6.2.1, 3 pages, Jeju, Korea.

3GPP TS 36.213, "Evolved Universal Terrestrial Radio Access (E-UTRA); Physical layer procedures", Mar. 2014, 186 pages, Version 12.1.0, Release 12, Valbonne, France.

Ericsson et al, "DRX and IDC gaps for IDC interference avoidance", 3GPP TSG-RAN WG2 R2-121649, Mar. 2012, 4 pages, Meeting 77bis, Agenda 7.6.2.3, Jeju, South Korea.

Zte, "Discussion on the DRX based solution for IDC", 3GPP TSG-RAN WG2 R2-115768, Nov. 2011, 4 pages, Meeting 76, Agenda 7.6.1.3, San Francisco, USA.

3GPP TR 36.816, "Evolved Universal Terrestrial Radio Access (E-UTRA); Study on signaling and procedure for interference avoidance for in-device coexistence", Release 11, V 11.2.0, Dec. 2011, 2 pages.

* cited by examiner

```
DRX-Config-r11 ::=                      CHOICE {
    release                                 NULL,
    setup                                   SEQUENCE {
        onDurationTimer                         ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200},
        drx-InactivityTimer                     ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200, psf300, psf500, psf750,
                                                    psf1280, psf1920, psf2560, psf0-v1020,
                                                    spare9, spare8, spare7, spare6,
                                                    spare5, spare4, spare3, spare2,
                                                    spare1},
        drx-RetransmissionTimer                 ENUMERATED {
                                                    psf1, psf2, psf4, psf6, psf8, psf16,
                                                    psf24, psf33},
        longDRX-CycleStartOffset                CHOICE {
            sf10                                    INTEGER(0..9),
            sf20                                    INTEGER(0..19),
            sf32                                    INTEGER(0..31),
            sf40                                    INTEGER(0..39),
            sf64                                    INTEGER(0..63),
            sf80                                    INTEGER(0..79),
            sf128                                   INTEGER(0..127),
            sf160                                   INTEGER(0..159),
            sf256                                   INTEGER(0..255),
            sf320                                   INTEGER(0..319),
            sf512                                   INTEGER(0..511),
            sf640                                   INTEGER(0..639),
            sf1024                                  INTEGER(0..1023),
            sf1280                                  INTEGER(0..1279),
            sf2048                                  INTEGER(0..2047),
            sf2560                                  INTEGER(0..2559),
            sf2                                     INTEGER(0..1),
            sf5                                     INTEGER(0..4),
            sf8                                     INTEGER(0..7),
            spare13 NULL, spare12 NULL, spare11 NULL, spare10 NULL, spare9 NULL,
            spare8 NULL, spare7 NULL, spare6 NULL, spare5 NULL, spare4 NULL,
            spare3 NULL, spare2 NULL, spare1 NULL
        },
        shortDRX                                SEQUENCE {
            shortDRX-Cycle                          ENUMERATED {
                                                        sf2, sf5, sf8, sf10, sf16, sf20,
                                                        sf32, sf40, sf64, sf80, sf128, sf160,
                                                        sf256, sf320, sf512, sf640},
            drxShortCycleTimer                      INTEGER (1..16)
        }   OPTIONAL                                                        -- Need OR
```

FIG. 4

RADIO COEXISTENCE IN WIRELESS NETWORKS

CROSS REFERENCE TO RELATED APPLICATIONS

The present application claims priority to U.S. Provisional Patent Application No. 61/642,223, filed May 11, 2012, the entire specification of which is hereby incorporated by reference in its entirely for all purposes.

BACKGROUND

Modern wireless devices such as cell phones, tablets, and other portable computing devices often include multiple types of radios for communication purposes. For instance, a smart phone may include a 4G transceiver to connect to a cell tower, a WiFi transceiver to connect to a local internet hot spot, and a Bluetooth transceiver to connect to a nearby device such as a headset or keyboard. The WiFi transceiver can receive information at substantially the same time period as when the Bluetooth transceiver transmits information. In some examples, the 4G transceiver can transmit information at substantially the same time period as when the Bluetooth transceiver receives information. Thus, coexistence interference can result between the WiFi transceiver and the Bluetooth transceiver, or between the 4G transceiver and the Bluetooth receiver, operating in the smart phone, thereby reducing the effectiveness of communication of each of the collocated transceivers.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4 illustrates an ASN code example of DRX configuration information in accordance with an example.

Figure 1:
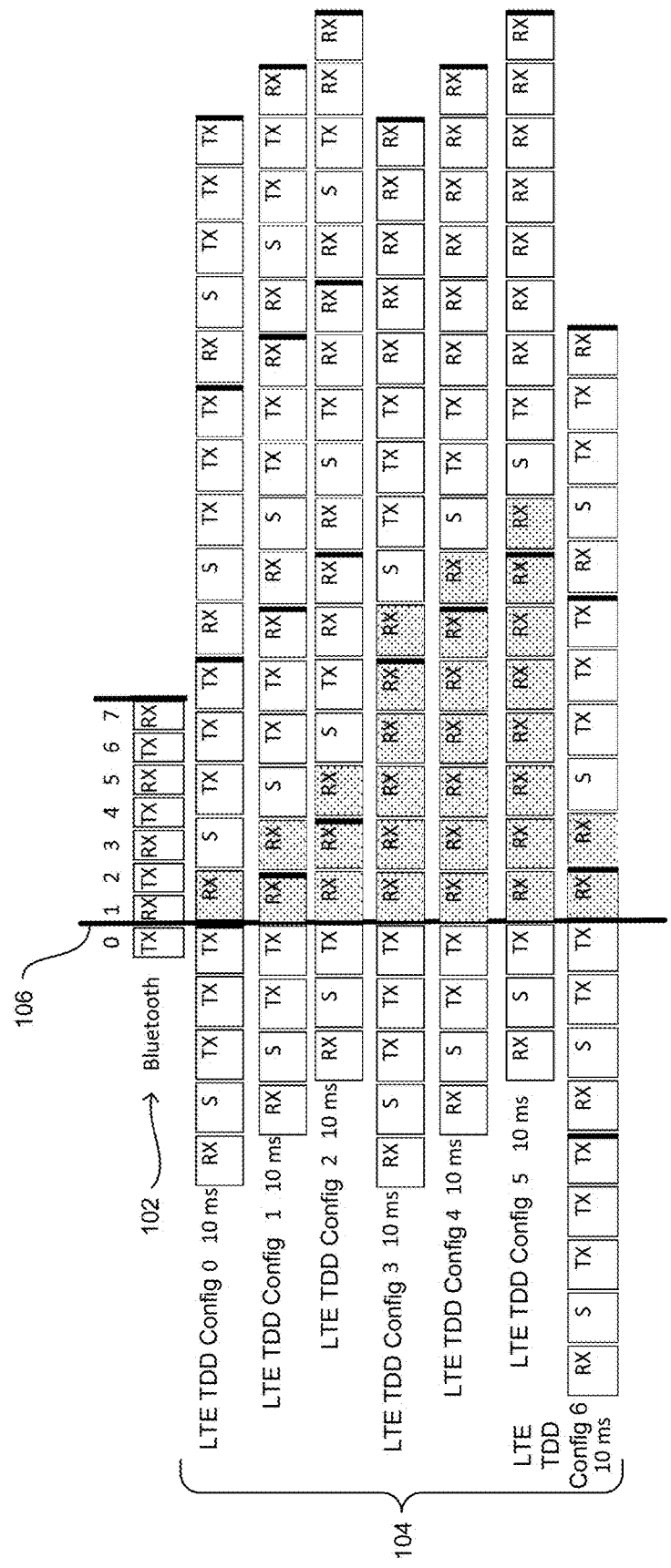
FIG. 1 illustrates a timing diagram of Bluetooth packets synchronized with subframes in several time division duplex (TDD) configurations of a Third Generation Partnership Project (3GPP) Long Term Evolution (LTE) transceiver in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Bluetooth transceivers are often collocated with other types of radios and/or transceivers. For example, transceivers which communicate using Orthogonal Frequency Division Multiple Access (OFDMA), such as a Third Generation Partnership Project (3GPP) Long Term Evolution (LTE) transceiver, an Institute of Electrical and Electronics Engineers (IEEE) 802.16 transceiver, commonly referred to as WiMAX (Worldwide interoperability for Microwave Access), a wireless local area network (WLAN) transceiver (i.e., IEEE 802.11 radio, commonly referred to as WiFi), and/or a Global Navigation Satellite System (GNNS) receiver.

Each collocated radio may be used for a specific purpose. For instance, a Bluetooth transceiver can be used to communicate with a wireless personal area network (WPAN), a WiFi transceiver can be used to communicate with a wireless local area network (WLAN), and a 3GPP LTE or WiMAX transceiver can be used to communicate with a wireless wide area network (WWAN).

The simultaneous operation in a wireless device (e.g., a smart phone or tablet) of a Bluetooth transceiver that is collocated with other types of transceivers which communicate using OFDMA, such as a 3GPP LTE transceiver, a WiMAX transceiver, and/or a WiFi transceiver, can create interference that reduces the data throughput of both transceivers. Multiple examples are given throughout this specification of a collocated Bluetooth transceiver and a 3GPP LTE transceiver. This is not intended to be limiting. The same system(s) and method(s) can apply with other types of OFDMA radios operating in a Time Domain Duplex (TDD) format that are collocated with a Bluetooth transceiver.

In general, TDD refers to duplex communication links where the uplink is separated from the downlink by an allocation of different time slots in the same frequency band. Since TDD allows asymmetric flow for uplink and downlink data transmissions, users are allocated time slots for uplink and downlink transmission. TDD can be advantageous when there is asymmetry of uplink and downlink data rates.

Bluetooth receptions can collide with transmissions from the 3GPP LTE transceiver, especially when both transceivers are collocated on the same device, such as a smart phone, a tablet, a net book, a laptop, or another type of wireless mobile device. Bluetooth transmissions can also desensitize reception in the 3GPP LTE transceiver.

To reduce coexistence interference, there are several types of potential solutions. One potential solution is to use frequency division multiplexing (FDM) to move the signal from one transceiver further away in frequency from the signal of another transceiver, thereby creating more frequency separation. Another potential solution is the use of time division multiplexing (TDM) in which scheduling can be used so that when one transceiver is transmitting, another co-located transceiver is not simultaneously receiving.

An example of TDM can include discontinuous reception (DRX), which will be discussed in further detail below. A radio frequency solution involves the use of radio frequency filtering which can be used to reduce the amount of out-of-bounds (OOB) emissions, using a filter at a transmitter, or blocking incoming out-of-bounds signals using a filter at a receiver. Power based solutions can be used to reduce transmission power, thereby potentially reducing the level of interference. Hybrid solutions are also possible by combining two or more of the previously presented solutions.

Repeating time-domain transmission/reception (Tx/Rx) patterns can be defined for a 3GPP LTE transceiver and a collocated Bluetooth transceiver to coordinate their transmitters and receivers. The Tx/Rx pattern can be repeated at a known interval if data gets allocated with a periodicity on time. The known interval enables persistent reservations to be made in the 3GPP LTE transceiver to reduce or avoid interferences between the different transceivers.

For example, the repeated Tx/Rx pattern defines a specific Bluetooth transmit time slot for each Extended Synchronous Connection Oriented (eSCO) packet transmitted by the Bluetooth transceiver to prevent the Bluetooth transmission from interfering with the 3GPP LTE reception, and to protect the 3GPP LTE transmission from interfering with Bluetooth reception.

The ability to coordinate the 3GPP LTE and Bluetooth transmitters and receivers using persistent reservation also enables additional types of transceivers to be collocated. For example, a WiFi transceiver can be coordinated to communicate at specific time periods in the coordination formed between the 3GPP LTE and Bluetooth transceivers.

FIG. 1 provides a timing diagram showing the transmission and reception of eSCO formatted packets 102 for a Bluetooth radio and the Tx/Rx sub-frames 104 for all seven configurations of a 3GPP LTE radio operating in a Time Division Duplex (TDD) mode. The figures and tables presented herein are displayed using one-slot Bluetooth eSCO packets as an example. However, this interference avoidance technique can be applied to other Bluetooth profiles and packet length (for example three or five slot packets). The Bluetooth eSCO packets can include a variety of different formats having a different number of transmit and receive time slots. For single slot eSCO packets, Bluetooth specifies intervals of 6, 8, 10, 12, 14, 16 and 18. The interval illustrated in FIG. 1 is $T_{eSCO}=8$, comprising four transmit time slots and four receive time slots. Bluetooth also specifies a re-transmit window $W_{eSCO}$ to be 0, 2, or 4. The re-transmit window specifies the number of attempts at transmitting that can occur for a Bluetooth packet within its interval ($T_{eSCO}$). While the specification currently limits the retransmission attempts to 0, 2 or 4 instances, it is possible to include additional retransmission attempts when $T_{eSCO}$ is equal or greater than 8. Future Bluetooth standards may include additional retransmission attempts, and the embodiments disclosed herein are not limited to the 0, 2 or 4 instances recited in the present standard.

The 3GPP LTE standard, as used herein, can include 3GPP LTE Release 8 in the fourth quarter of 2008, 3GPP LTE Advanced Release 10 in the first quarter of 2011, and Release 11 in the third quarter of 2012. However, the embodiments disclosed herein are not limited to these releases. Future standards can also apply when the same TDD configurations and sub-frame timing is used. A transceiver operating in accordance with at least one of these 3GPP LTE Releases is also referred to herein as an LTE transceiver. The use of the term 3GPP, 3GPP LTE, or LTE is not intended to be limiting. Any of the terms may refer to any of the 3GPP releases.

Currently, seven different LTE TDD configurations are defined for 3GPP LTE communication. FIG. 1 provides an example of each LTE configuration, numbered 0-6. Each configuration is aligned at the beginning 106 of the longer continuous number of receive subframes for each configuration. The Bluetooth packet is synchronized such that a first receive time slot (Slot 1) is aligned with the first receive subframe of the continuous receive subframes in each of the seven LTE configurations.

As illustrated in FIG. 1, the Bluetooth time slots 102 have a different time period from the LTE subframe. The Bluetooth time slots each have a period of 0.625 milliseconds (ms), while each LTE frame has a frame duration of 10 ms. Each LTE frame consists of 10 sub-frames. Thus, each subframe has a duration of 1 ms. Accordingly, even though the Bluetooth packet is synchronized such that transmit Slot 0 is aligned with a transmit subframe in each LTE TDD configuration, and receive Slot 1 is aligned with the first receive subframe in the continuous receive subframe for each configuration, the transmit and receive slots quickly become unaligned such that transmissions and receptions from the Bluetooth and 3GPP transceivers will create co-interference in each of the transceivers.

Co-interference can occur when one of the transceivers transmits during the other transceiver's receive interval. This is especially true when the 3GPP LTE transceiver transmits during the receive period of the Bluetooth transceiver, since the 3GPP LTE transceiver transmits at significantly higher power and can therefore overpower (or collide) most Bluetooth signals that the Bluetooth transceiver is attempting to receive during the Bluetooth receive period.

Figure 2:
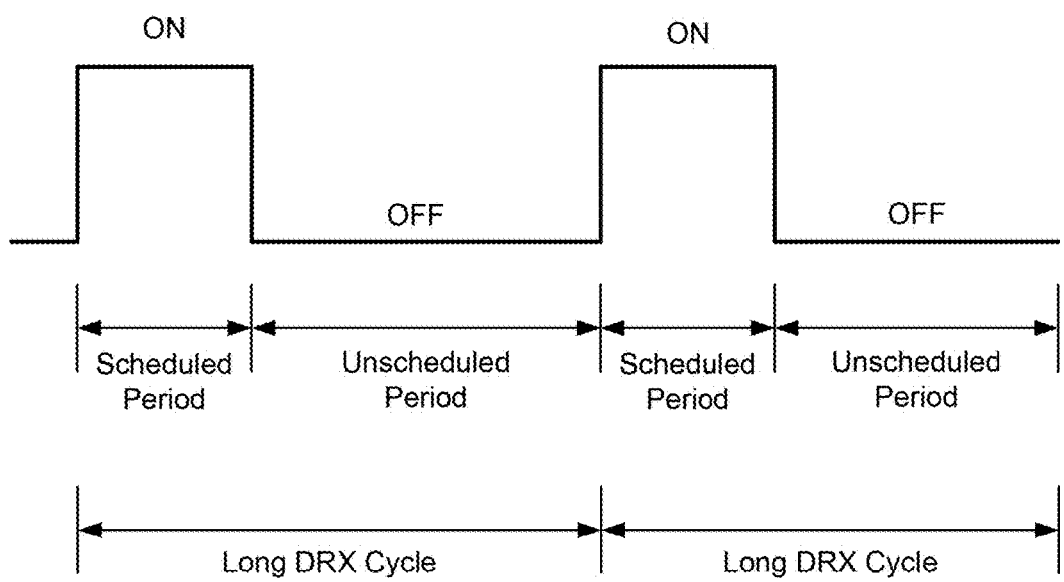
FIG. 2 is a diagram illustrating a long discontinuous reception (DRX) cycle in accordance with an example.

FIG. 2 is a diagram illustrating a long discontinuous reception (DRX) cycle in accordance with an example. The concept of DRX was introduced for saving power in 3GPP LTE Release 8. DRX can be used to enable a wireless device, such as a user equipment (UE) in a 3GPP LTE network, to discontinuously monitor a control channel, such as the physical downlink control channel (PDCCH) communicated from a transmission station such as an enhanced node (eNB or eNodeB). The discontinuous monitoring by using DRX can provide significant power savings at the UE since the receiver at the UE can be turned off for selected periods. The scheduling of a 3GPP LTE transceiver using DRX will be explained more fully below.

In accordance with one embodiment of the present invention, in addition to saving power, DRX can also be used to provide a TDM solution for reducing coexistence interference of co-located devices. For example, coexistence interference between a collocated 3GPP LTE transceiver and a low power Bluetooth (BT) transceiver can be reduced, using DRX, by scheduling the BT transceiver to transmit when the LTE transceiver is not receiving.

In one embodiment, a transceiver in a multi-radio wireless device (e.g., a LTE transceiver) can be configured to be turned off more often by reducing the amount of time that the transceiver monitors control channels, such as the physical downlink control channel (PDCCH). In other words, the transceiver can communicate with a transmission station, referred to as a network node, to negotiate time periods in which the transceiver will receive communications from the network node. During the negotiated times when information is not received, the transceiver can turn its receiver off and enter a low power state. DRX is used in a number of different wireless communication standards, including but not limited to 3GPP LTE Rel. 8, 9, 10, and 11.

The 3GPP LTE transceiver can be operable to monitor the PDCCH discontinuously if the 3GPP LTE transceiver is configured for DRX and is in an RRC_CONNECTED mode. Otherwise, a 3GPP LTE transceiver not configured for DRX can monitor the PDCCH continuously. The Radio Resource Control (RRC) can be used to control the DRX operation in the 3GPP LTE transceiver by configuring the parameters onDurationTimer, drx-InactivityTimer, longDRX-Cycle, drxStartOffset and optionally drxShortCycleTimer and shortDRX-Cycle. When a short DRX cycle is not configured, the 3GPP LTE transceiver monitors the PDCCH at the beginning (according to the length defined in onDurationTimer) of the longDRX-Cycle parameter. The 3GPP LTE transceiver can stop monitoring the PDCCH after onDuration-Timer if the downlink and/or uplink transmissions can be completed. In the remaining DRX cycle (e.g., a short DR cycle), the 3GPP LTE transceiver can become inactive. During this time, the eNB does not schedule downlink transmissions nor will the eNB require the 3GPP LTE transceiver to transmit uplink data. When the short DRX cycle is configured, the short DRX cycle can be considered as a confirmation period for when a packet arrives late, prior to the 3GPP LTE transceiver entering the long DRX cycle. When data arrives at the eNB while the 3GPP LTE transceiver is in the short DRX cycle, the data is scheduled for transmission at the next wake-up time, after which the 3GPP LTE transceiver resumes continuous reception. On the other hand, if no data arrives at the eNB during the short DRX cycle, then the 3GPP LTE transceiver can enter the long DRX cycle if the packet activity is finished for the time being. The DRX Activity Time is the duration when the 3GPP LTE transceiver monitors the PDCCH within the DRX cycle.

Returning to FIG. 2, an example long DRX cycle is shown. The long DRX cycle can include an ON duration and an OFF duration. During the ON period of the long DRX cycle (i.e., a scheduled period), the eNB can schedule transmissions with the UE. During the OFF period of the long DRX cycle (i.e., an unscheduled period), the eNB does not schedule transmissions with the UE. In general, the UE can transition to the long DRX cycle from an optional short DRX cycle after the expiration of a timer.

Figure 3A:
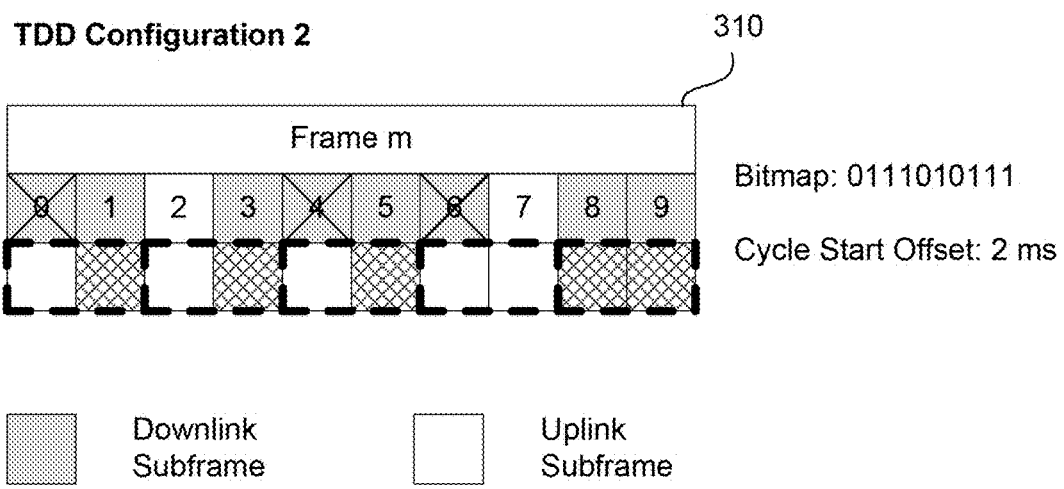
FIGS. 3A and 3B illustrate example TDD configurations that support DRX patterns in accordance with an example.
Figure 3B:
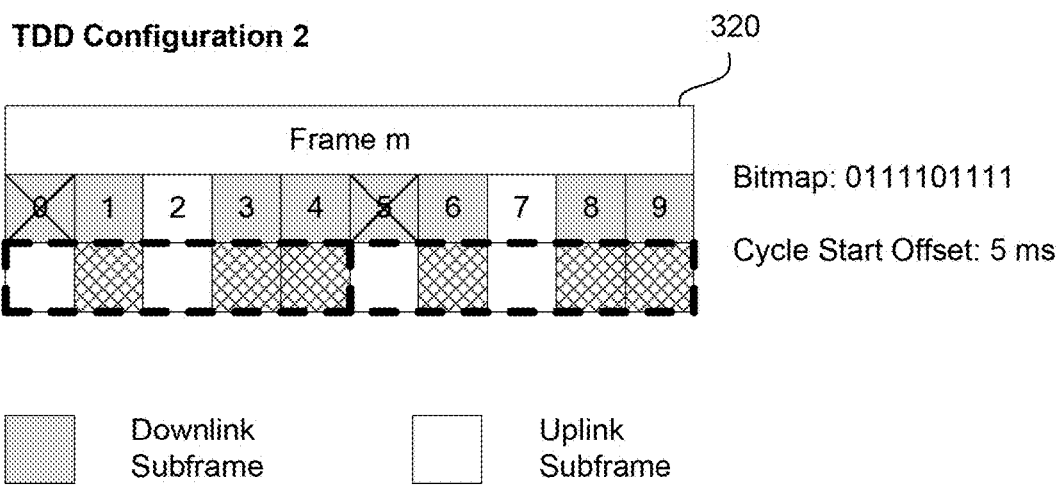

FIGS. 3A and 3B illustrate example TDD configurations 310 and 320 that support DRX patterns in accordance with an example. One limitation of using a DRX solution to reduce coexistence interference in a multi-radio device is that current supported longDRX-Cycle values do not include several values that can be used to significantly improve in-device coexistence scenarios. For example, long DRX cycle values that can be used to reduce in-device interference in an LTE and Bluetooth scenario (e.g., an LTE transceiver transmitting/receiving information at substantially the same time as a Bluetooth transceiver transmitting/receiving information) are not allowed. These long DRX cycle values can include 2 milliseconds (ms), 5 ms, and/or 8 ms. As will be discussed in greater detail below, the 2 ms, 5 ms, and 8 ms long DRX cycle values can provide one or more useful Hybrid Automatic Repeat Request (HARQ) process reservation patterns.

One limitation of using DRX to reduce coexistence interference in an LTE and Bluetooth scenario is that DRX supports contiguous LTE downlink (DL) subframes within a single DRX cycle when the LTE On Duration period is not extended. Using currently available DRX cycle values, when using the DRX solution for the LTE and Bluetooth scenario, the DRX cycle is 10 ms. In addition, a 5 ms short DRX cycle can be used within the 10 ms long DRX cycle. Thus, DRX can support bitmap patterns with LTE ON downlink subframes that are contiguous in a 10 ms period or a 5 ms period.

FIG. 3A illustrates an example of a DRX pattern with a cycle time that can be used to reduce in-device interference in a multi-radio device. In particular, the advantages of including a 2 ms long DRX cycle for the LTE and Bluetooth scenario are shown. The example configuration 310 is a TDD configuration 2. The configuration 310 includes m number of frames, and has a cycle start offset of 2 ms. The total length of the configuration 310 is 10 ms in length, and each subframe is 1 ms in length. In addition, the configuration 310 can be represented by the bitmap 0111010111. In other words, a "0" means that the subframe cannot be used (e.g., the subframe can be turned off), and a "1" means that the sub-frame can be used. Here, the subframes that are turned off are 0, 4, and 6, therefore resulting in the bitmap of 0111010111. The subframes in the configuration 310 can either be downlink (DL) subframes or uplink (UL) subframes. Here, the DL subframes are shaded and the UL subframes are clear. According to the TDD configuration 2 (which is one of the seven TDD configurations available), subframes 0, 1, 3, 4, 5, 6, 8, and 9 are DL subframes and subframes 2 and 7 are uplink subframes. In addition, for DRX patterns relating to the LTE and Bluetooth scenario, uplink subframes are generally disregarded. Therefore, subframes 0, 4, and 6 are off, and subframes 2 and 7 are uplink, resulting in subframes 1, 3, 5, 8, and 9. In other words, subframes 1, 3, 5, 8, and 9 are LTE ON subframes, and are represented as textured subframes.

Therefore, a 2 ms long DRX cycle value can be advantageous with configuration 310 to allow more HARQ bitmap patterns to be supported. The $1^{st}$ subframe is included in the first 2-ms cycle, the $3^{rd}$ subframe is included in the second 2-ms cycle, the $5^{th}$ subframe is included in the third 2-ms cycle, and both the $8^{th}$ and $9^{th}$ subframe are included in the fifth 2-ms cycle. Neither subframes 6 or 7 are included in the fourth 2-ms cycle because subframe 6 is OFF and subframe 7 is an uplink subframe. The subframe 8 is considered as onDuration because the unit of onDurationTimer is a PDCCH subframe, which is DL subframes in the case of TDD. Therefore, the onDurationTimer starts at subframe 7, but since subframe 7 is an UL subframe, it extends to subframe 8. Therefore, subframe 8 is considered ON. If the 2 ms long DRX cycle is not supported then another HARQ bitmap pattern will need to be used that will result in fewer subframes being used by the LTE.

FIG. 3B illustrates an example of an additional DRX pattern with a cycle time that can be used to reduce in-device interference in a multi-radio device. In particular, the advantages of including a 5 ms long DRX cycle for the LTE and Bluetooth scenario are shown. Particularly, the use of the 5 ms long DRX cycle allows additional HARQ bitmap patterns to be used. Without the ability to use a 5 ms long DRX cycle, fewer LTE subframes can be used.

The example configuration 320 is a TDD configuration 2. The configuration 320 includes m number of frames, and has a cycle start offset of 5 ms. In addition, the configuration 320 can be represented by the bitmap 0111101111. Here, the subframes that are turned off are 0 and 5, therefore resulting in the bitmap of 0111010111. According to the TDD configuration 2 (which is one of the seven TDD configurations available), subframes 0, 1, 3, 4, 5, 6, 8, and 9 are DL subframes and subframes 2 and 7 are uplink subframes.

Since uplink subframes (i.e., subframes 2 and 7) can generally be disregarded when looking at DRX patterns relating to the LTE and Bluetooth scenario, and subframes 0 and 5 are off, the result is subframes 1, 3, 4, 6, 8 and 9. In other words, subframes 1, 3, 4, 6, 8, and 9 are LTE ON downlink subframes that are received by the 3GPP LTE transceiver. Therefore, a 5 ms long DRX cycle value can be advantageous with configuration 320. The subframes 1, 3 and 4 are included in the first 5-ms cycle, and subframes 6, 8 and 9 are included in the second 5-ms cycle. A 10 ms long DRX cycle value cannot be used with TDD configuration 2 because subframe 5 is turned off.

In the LTE and Bluetooth scenario, the 2 ms and 5 ms long DRX cycle values can provide useful HARQ process reservation patterns for Time Division Duplex (TDD). In general, HARQ can be used to ensure that data is sent reliably from one node to another node. HARQ uses a stop and wait protocol. A transmitting entity (e.g., a LTE transceiver) transmits the data block to a receiving entity (e.g. an eNB). The transmitting entity stops and waits until it receives an acknowledgement (ACK) or a negative acknowledgement (NACK) from the receiving entity. If the transmitting entity receives an ACK, then the next data block is transmitted. If the transmitting entity receives a NACK, then the same data block can be retransmitted. Whether an ACK or a NACK is received, the transmitting entity schedules and processes the next data block to be transmitted within a specific time period. In LTE, a N-process stop-and-wait may be used, where the transmitting entity stops and waits for one particular HARQ process. For example, the transmission may stop and wait for one particular HARQ process. However, there are multiple HARQ processes, so from the transmitter perspective, it does not stop its transmission.

Generally, LTE uses multiple HARQ parallel processes that are offset in time. Since each process transmits a block of data, by the time a next transmission allocation arrives, the transmitting entity would have already received the ACK or the NACK from the receiving entity, and therefore created the next data block to be transmitted or retransmitted. Thus, from the perspective of the transmitting entity, data may be constantly transmitted to the receiving entity. In TDD, a configurable number of HARQ processes are supported.

By applying the 2 ms and 5 ms long DRX cycle values to the LTE and Bluetooth scenario, 2 ms and 5 ms patterns are created. These 2 ms and 5 ms patterns can be considered to be HARQ compliant patterns. A pattern can be HARQ compliant if: (1) each LTE DL subframe that is enabled is associated with at least one LTE UL subframe for either a DL or UL HARQ process; and (2) each LTE UL subframe that is enabled is associated with at least one LTE DL subframe for either a DL or UL HARQ process; and (3) at least one LTE DL HARQ process and one UL HARQ process are enabled. In a TDD Configuration 2, there are 192 HARQ compliant patterns and 51 HARQ compliant patterns that are supported when DRX is applied to the LTE and Bluetooth scenario. Therefore, the ratio of HARQ compliant patterns that are supported when DRX is applied to the LTE and Bluetooth scenario is 27%. In addition, the 2 ms and 5 ms long DRX cycle values support additional HARQ bitmap patterns. Without using the 2 ms and 5 ms long DRX cycle values, the HARQ bitmap pattern may use a fewer number of LTE subframes. In other words, the bitmap may include additional "0s" indicating that the particular subframe cannot be used.

Providing at least one HARQ process reservation pattern ensures that each radio transceiver of the UE is not transmitting/receiving information while a different radio transceiver of the UE is receiving/transmitting information. Thus, coexistence interference is reduced between the plurality of radio transceivers in the UE. In addition, each radio transceiver can include a different Radio Access Technology (RAT). Examples of RATs include 3GPP LTE, WiMAX, Bluetooth, WLAN, GNSS, etc.

Figure 3C:
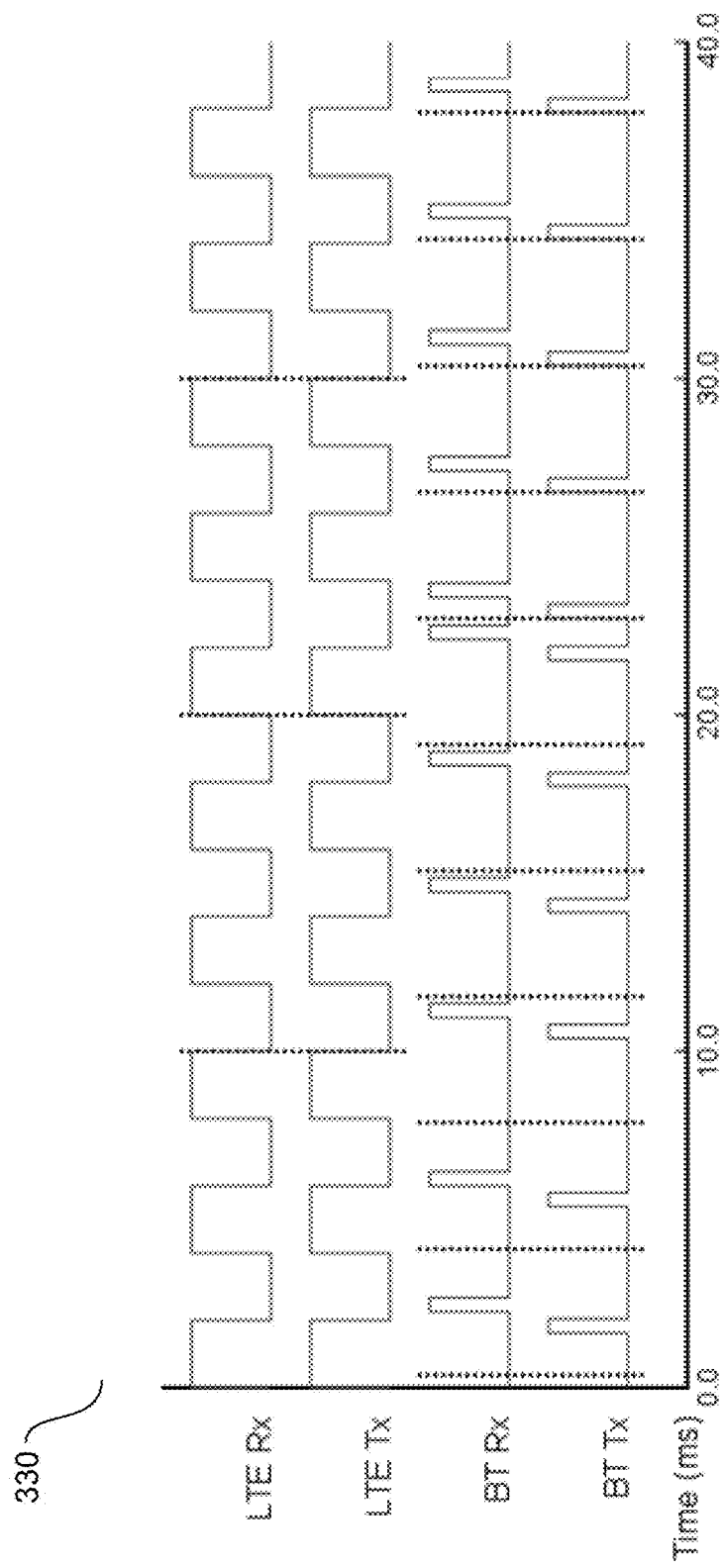
FIG. 3C is a timing diagram showing a LTE transmit/receive pattern and a Bluetooth transmit/receive pattern in accordance with an example.

FIG. 3C is a timing diagram 330 showing an LTE transmit/receive pattern and a Bluetooth transmit/receive pattern in accordance with an example. The LTE Rx pattern and the LTE Tx pattern are identical. Each ON and OFF cycle lasts for 2 ms. Thus, the bitmap of the LTE Rx and the LTE Tx is 11001100. Each digit (e.g., "1") indicates whether the LTE is ON or (e.g., "0") OFF during a one-second period. Therefore, the "11" indicates an ON period for two seconds, and the "00" indicates an OFF period for two seconds. As indicated by the timing diagram 300, there is no interference between the LTE transmission and the Bluetooth reception. In other words, during the time when the LTE is transmitting (i.e., LTE Tx ON), the Bluetooth is not receiving. Similarly, during the time when the Bluetooth is receiving (i.e., BT Rx ON), the LTE is not transmitting. Although there is some overlap between the LTE reception and the Bluetooth transmission, generally no interference results due to the overlap. The assumption is that the Bluetooth transmission does not interfere with the LTE reception because the LTE downlink frequency band does not coincide with the Bluetooth transmission frequency band.

The timing diagram 300 relates to LTE operating in a frequency division duplex (FDD). In FDD, separate frequency bands are used at the transmitting side and the receiving side. Since FDD uses different frequency bands for sending and receiving information, the sending and the receiving data signals do not interfere with each other.

The timing diagram 300 is a bitmap-based TDM solution for the coexistence between LTE and Bluetooth. Having a bitmap of 8 ms (e.g., 11001100) ensures that the LTE does not transmit information at substantially the same time as the Bluetooth receiving information. Therefore, having an 8 ms long DRX cycle (which corresponds to the bitmap that is 8 ms in length) can be useful for LTE FDD. In some examples, having a 4 ms long DRX cycle can be useful for LTE FDD, but unlike the 8 ms long DRX cycle, the 4 ms long DRX cycle does not take advantage of the HARQ process reservation patterns in LTE FDD. In other words, a number of LTE FDD HARQ processes can be masked off to accommodate coexistence between LTE and Bluetooth. For FDD, there are 8 uplink HARQ processes, while the downlink can have up to 8 HARQ processes. The downlink HARQ processes can be transmitted in any order without a fixed timing, whereas each uplink HARQ process is assigned to a specific subframe. The UE transmits within the same HARQ process every eighth subframe. Therefore, an 8 ms long DRX cycle can be useful for reducing coexistence interference between LTE and Bluetooth because the 8 ms long DRX cycle corresponds with the 8 uplink and downlink HARQ processes found in FDD.

FIG. 4 illustrates an ASN.1 code example of DRX configuration information in accordance with an example. The Abstract Syntax Notation 1 (ASN.1) can be used to implement enhancements to existing DRX configurations. The DRX-Config-r11 (i.e., DRX Configuration 11) is used to define various characteristics of the DRX cycles. The existing DRX-Config-r11 includes ASN.1 code to define the onDurationTimer, drx-InactivityTimer, drx-RetransmissionTimer, longDRX-CycleStartOffset, shortDRX-Cycle, and the drxShortCycleTimer. Currently, the longDRX-CycleStartOffset includes cycle values of sf10, sf20, sf32, sf40, etc. The addition of the 2 ms, 5 ms, and 8 ms long DRX cycle values can be included in the DRX-Config-r11 by adding the cycle values of sf2, sf5, and sf8 into the ASN.1 code. Since the existing DRX-Config-r11 does not allow extensions, a new DRX-Config-r11 can be configured with the 2 ms, 5 ms, and 8 ms long DRX cycle values to provide additional DRX patterns that can be used to reduce in-device interference in a multi-radio device, as discussed in the preceding paragraphs.

Figure 5:
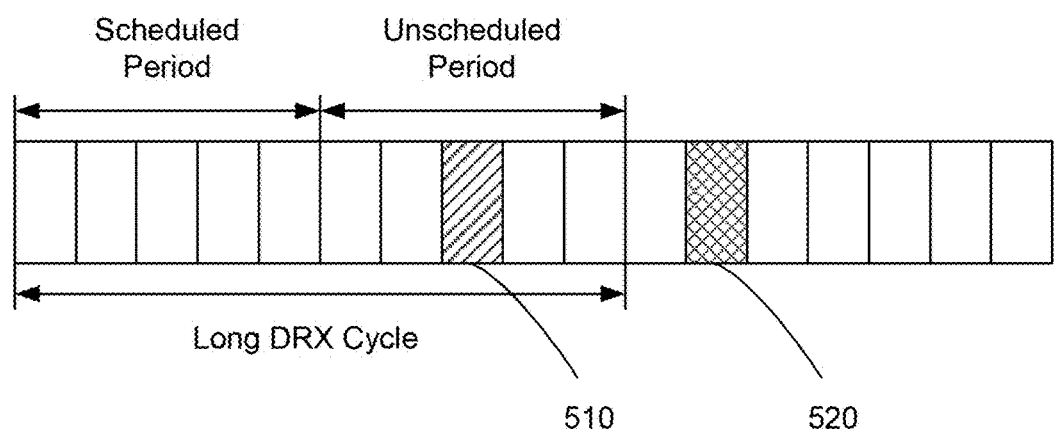
FIG. 5 illustrates a channel state information (CSI) reference resource during a long DRX cycle in accordance with an example.

FIG. 5 illustrates a subframe used to receive a downlink reference resource 510 during a long DRX cycle in accordance with an example. The downlink reference resource 510 can include a reference signal (RS) transmitted from the eNB. The measured power of the reference signal at the UE is used to determine the power at which the eNB transmits the downlink data. The measured power of the reference signal can be communicated via a Channel State Information (CSI) report to the eNB.

In wireless communications, the CSI can refer to known channel properties of a communication link. The CSI describes how a signal propagates from the transmitter to the receiver. In addition, the CSI can represent the combined effect of scattering, fading, etc. The CSI ensures that transmissions are adapted to current channel conditions, thereby leading to reliable communication by Bluetooth transceivers, LTE transceivers, etc. The CSI is periodically transmitted from the UE to the eNB.

In general, the CSI can include at least one of a channel quality indicator (CQI), a precoding matrix indicator (PMI), and a rank indicator (RI). The CQI is information signaled by the UE to the eNB to indicate a suitable data rate for downlink transmission. The CQI can be based on a measurement of the receiving downlink Signal to Interference plus Noise Ratio (SINR), as well as knowing various characteristics of the UE receiver. The PMI is a signal fed back by the UE, and corresponds to an index of a precoder that maximizes the aggregate number of data bits which can be received acrossed the downlink spatial transmission layers. The RI is signaled to the eNB by UEs that are configured for a Physical Downlink Shared Channel (PDSCH). The RI corresponds to the number of useful transmission layers for spatial multiplexing (based on the UE's estimate of the downlink channel), The CSI report is typically communicated at least four symbols after the downlink referenced resource 510. In order for the measurement of the reference signal to be accurate, the reference signal should be received in a downlink subframe with minimal interference. Interference can reduce the accuracy of the reference signal measurement and impact the accuracy of the CSI report. Accordingly, it can be important to select a downlink subframe to receive the reference signal that has little interference.

Currently, the rules for selecting a downlink subframe for a downlink reference resource 510 do not consider the impact of in-device interference. As a result, the measurement of the reference signal received in the downlink reference resource 510 symbol can be negatively impacted when there is in-device interference (e.g., a Bluetooth transceiver is transmitting information at substantially the same time as when a LTE transceiver is receiving the reference signal).

As illustrated in FIG. 5, the long DRX cycle of an LTE (or WWAN) transceiver can be partitioned into a scheduled period and an unscheduled period. When transitioning from an LTE unscheduled period to an LTE scheduled period, the UE can be configured to send the CSI (e.g., the CQI, PMI, and RI) to the eNB. In other words, the LTE transceiver in the UE can be configured to transmit the CSI to the eNB. The CSI can be based on the reference signal received in the downlink reference resource 510. The downlink reference resource 510 (i.e., the time domain reference) can be defined by a downlink subframe $n-n_{CQI\_ref}$.

The CSI reporting subframe 520 occurs at least four subframes after the downlink subframe $n-n_{CQI\_ref}$. In other words, the CSI is periodically reported at an uplink subframe to the eNB, and the uplink subframe occurs at least four subframes after receiving the downlink reference resource 510 subframe from the eNB. Therefore, the CSI reporting subframe 520 is located after a long DRX cycle of a transceiver (e.g., a WWAN transceiver) in the UE, and corresponds with the downlink reference resource 510 (i.e., the downlink subframe $n-n_{CQI\_ref}$). In some examples, the CSI is reported more than four subframes (e.g., six subframes) after the downlink subframe $n-n_{CQI\_ref}$.

When DRX is used as a TDM solution, the CSI measurement needs special handling. Otherwise, the downlink reference resource 510 can be impacted by in-device interference between collocated transceivers in the multi-radio device, thereby causing the UE to report an inaccurate CSI. An inaccurate CSI can substantially reduce the system throughput. In other words, the average rate of successful message delivery over a communication channel can reduce as a result of the inaccurate CSI. Therefore, the downlink reference resource 510 should not be impacted by in-device interference.

The downlink subframe $n-n_{CQI\_ref}$ can be considered to be valid if the downlink subframe $n-n_{CQI\_ref}$ is not interfered by in-device interference. Therefore, if the UE receives the reference signal or other type of downlink reference resource in a downlink subframe from the eNB during a time period that does not correspond with a different coexisting radio transceiver in the UE transmitting an uplink subframe, then the downlink subframe is not impacted by in-device interference. In other words, the downlink subframe $n-n_{CQI\_ref}$ is not received at the UE, from the eNB, while in-device interference currently exists. As a result, the downlink subframe $n-n_{CQI\_ref}$ is valid and can be used for receiving a downlink reference resource.

In some examples, the downlink subframe $n-n_{CAI\_ref}$ may be assigned by the eNB to be received by the UE (e.g. a LTE transceiver in the UE) in a subframe at the same time that a different transceiver in the UE (e.g., a Bluetooth transceiver) is transmitting information. If it is known that this occurs, then the downlink subframe n-n$_{CQI\_ref}$ can be designated as invalid and cannot be used for receiving a reference symbol from the eNB. In other words, the downlink reference resource 510 can be identified to not be used if the downlink subframe associated with the downlink reference resource 510 is interfered by in-device interference.

In some examples, to reduce the chance of in-device interference in a downlink subframe, the downlink subframe can be designated as invalid if the downlink subframe belongs to the unscheduled period of the long DRX cycle, as illustrated in FIG. 5. The subframes designated as invalid will not be used by the eNB to transmit data to the UE. Therefore, if a DRX solution is used for in-device coexistence, then the downlink reference resource 510 can be received in a downlink subframe that is not included in the unscheduled period of the long DRX cycle. In one embodiment, a downlink subframe included in the scheduled period of the long DRX cycle can be designated as a valid subframe for the UE to use to receive a downlink reference resource, such as an RS. In addition, a subframe in the unscheduled period can be used by the UE to report the CSI to the eNB that is based on the reference resource.

In one embodiment, the downlink subframe n-n$_{CQI\_ref}$ can be considered to be valid (i.e. capable of receiving the reference signal) if: (1) the downlink subframe is configured as a downlink subframe for the UE; (2) the downlink subframe does not include a Multimedia Broadcast Single Frequency Network (MBSFN) subframe (except for transmission mode 9); (3) the downlink subframe does not contain a Downlink Pilot Time Slot (DwPTS) field in case the length of DwPTS is 7680·T$_s$ and less; (4) the downlink subframe does not fall within a configured measurement gap for the UE; (5) the downlink subframe, for periodic CSI reporting, is an element of the CSI subframe set that is linked to the periodic CSI report when the UE is configured with CSI subframe sets; and (6) the downlink subframe is not interfered by in-device interference. In addition, the downlink subframe n-n$_{CQI\_ref}$ can be considered to be valid if the downlink subframe is not part of an unscheduled period when DRX is being used to reduce in-device coexistence.

In some embodiments of the present invention, radio link monitoring (RLM), performed by a WWAN transceiver of a UE, can use subframes with substantially no in-device interference from a plurality of coexisting radio transceivers in the UE. The RLM function in the UE is to monitor the downlink radio link quality of a serving cell in an RRC_CONNECTED state. The RLM is based on the cell-specific reference signals. As a result, the UE in RRC_CONNECTED state can determine whether it is in-sync or out-of-sync with respect to the serving cell. In case of a certain number of consecutive out-of-sync indications (called 'N310'), the UE can start a network-configured radio link failure timer 'T310'. The timer is stopped if a number 'N311' of consecutive in-sync indications are reported by the UE's physical layer. Both the out-of-sync and in-sync counters (N310 and N311) are configurable by the network. Upon expiry of the timer T310, Radio Link Failure (RLF) occurs. As a consequence, the UE turns off its transmitter to avoid interference and is then required to re-establish the RRC connection.

When subframes that are impacted by in-device interference are used for RLM, the interference can result in errors in measuring the cell-specific reference signals. For example, during an unscheduled period of the long DRX cycle, other RATs (e.g., WLAN, Bluetooth) can transmit information. Thus, a Bluetooth transceiver in the UE can be transmitting information at substantially the same subframe as an LTE transceiver is receiving information, such as the cell-specific reference signals. If multiple errors are received, the UE may report a radio link failure, turn off the WWAN transmitter, and proceed to re-establish an RRC connection. This can result in a reduced throughput and unnecessary overhead for the 3GPP network.

In some examples, a WWAN radio transceiver of a UE can be configured to receive RLM in a downlink subframe that occurs during a scheduling period of a long DRX cycle, thereby decreasing a likelihood of performing RLM using subframes that are impacted by in-device interference. Thus, the UE may not use subframes that are impacted by in-device interference while the UE is performing RLM. In addition, during an unscheduled period of the long DRX cycle, the UE may determine which subframes are not interfered by in-device interference. The UE may perform RLM using the subframes that are not interfered by in-device interference.

Figure 6:
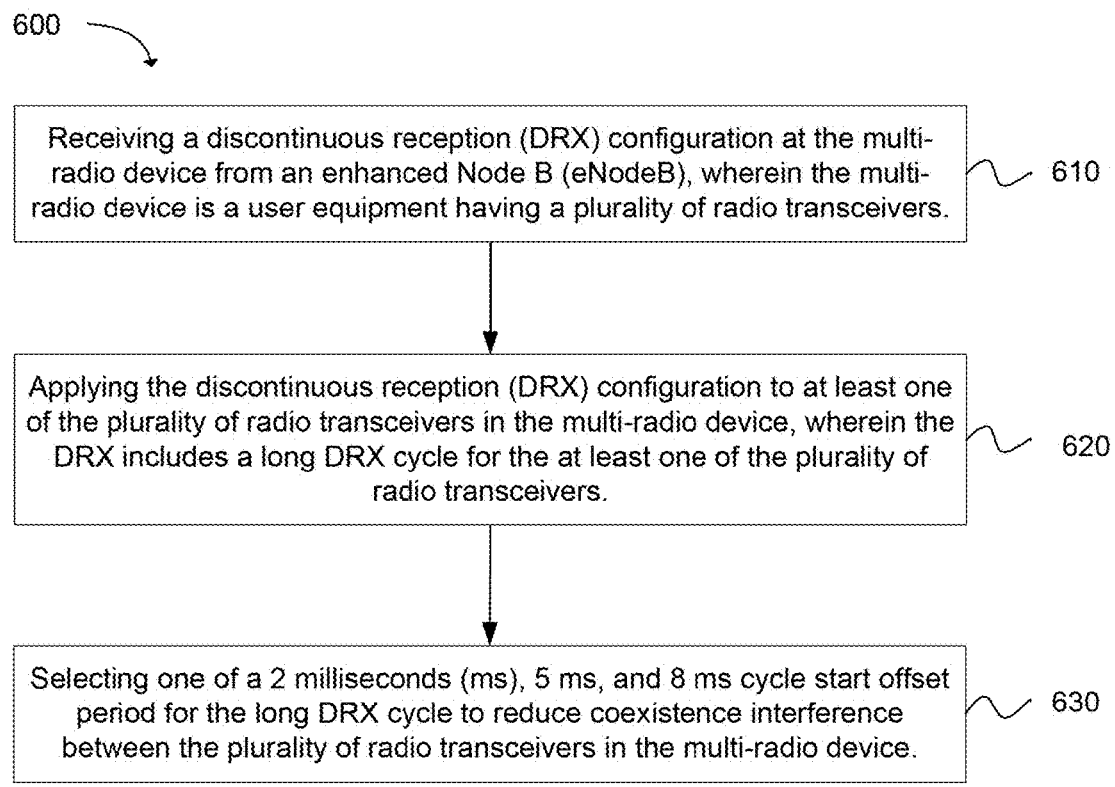
FIG. 6 depicts a flow chart of a method for reducing coexistence interference in a multi-radio device in accordance with an embodiment of the present invention.

In another embodiment, a method 600 for reducing coexistence interference in a multi-radio device is disclosed, as depicted in the flow chart of FIG. 6. The method includes the operation of receiving 610 a discontinuous reception (DRX) configuration at the multi-radio device from an enhanced Node B (eNodeB). The multi-radio device can be a user equipment having a plurality of radio transceivers. The method 600 further comprises applying 620 the discontinuous reception (DRX) configuration to at least one of the plurality of radio transceivers in the multi-radio device. The DRX can include a long DRX cycle for the at least one of the plurality of radio transceivers. The method 600 further comprises selecting one of a 2 milliseconds (ms), 5 ms, and 8 ms cycle start offset period for the long DRX cycle to reduce coexistence interference between the plurality of radio transceivers in the multi-radio device.

In one embodiment, the plurality of radio transceivers in method 600 comprises a Third Generation Partnership Project Long Term Evolution (3GPP LTE) radio transceiver and a Bluetooth radio transceiver.

In one embodiment, the 2 ms cycle start offset period in method 600 provides at least one HARQ reservation pattern to reduce the coexistence interference between the Bluetooth radio transceiver and a LTE radio transceiver communicating in LTE Time Division Duplex (LTE-TDD). In addition, the 5 ms cycle start offset period in method 600 provides at least one HARQ reservation pattern to reduce the coexistence interference between the Bluetooth radio transceiver and a LTE radio transceiver communicating in LTE Time Division Duplex (LTE-TDD). Furthermore, the 8 ms cycle start offset period in method 600 provides at least one HARQ reservation pattern to reduce the coexistence interference between the Bluetooth radio transceiver and a LTE radio transceiver communicating in LTE Frequency Division Duplex (LTE-FDD). In addition, the method 600 can include monitoring, by the UE, the Physical Downlink Control Channel (PDCCH) during the long DRX cycle.

In one embodiment, the operation of selecting one of the plurality of cycle start offset periods in method 600 can include providing at least one HARQ process reservation pattern for ensuring that each radio transceiver of the UE is not transmitting/receiving information while a different radio transceiver of the UE is receiving/transmitting information, thereby reducing coexistence interference between the plurality of radio transceivers in the UE, wherein each radio transceiver includes a different Radio Access Technology (RAT).

Figure 7:
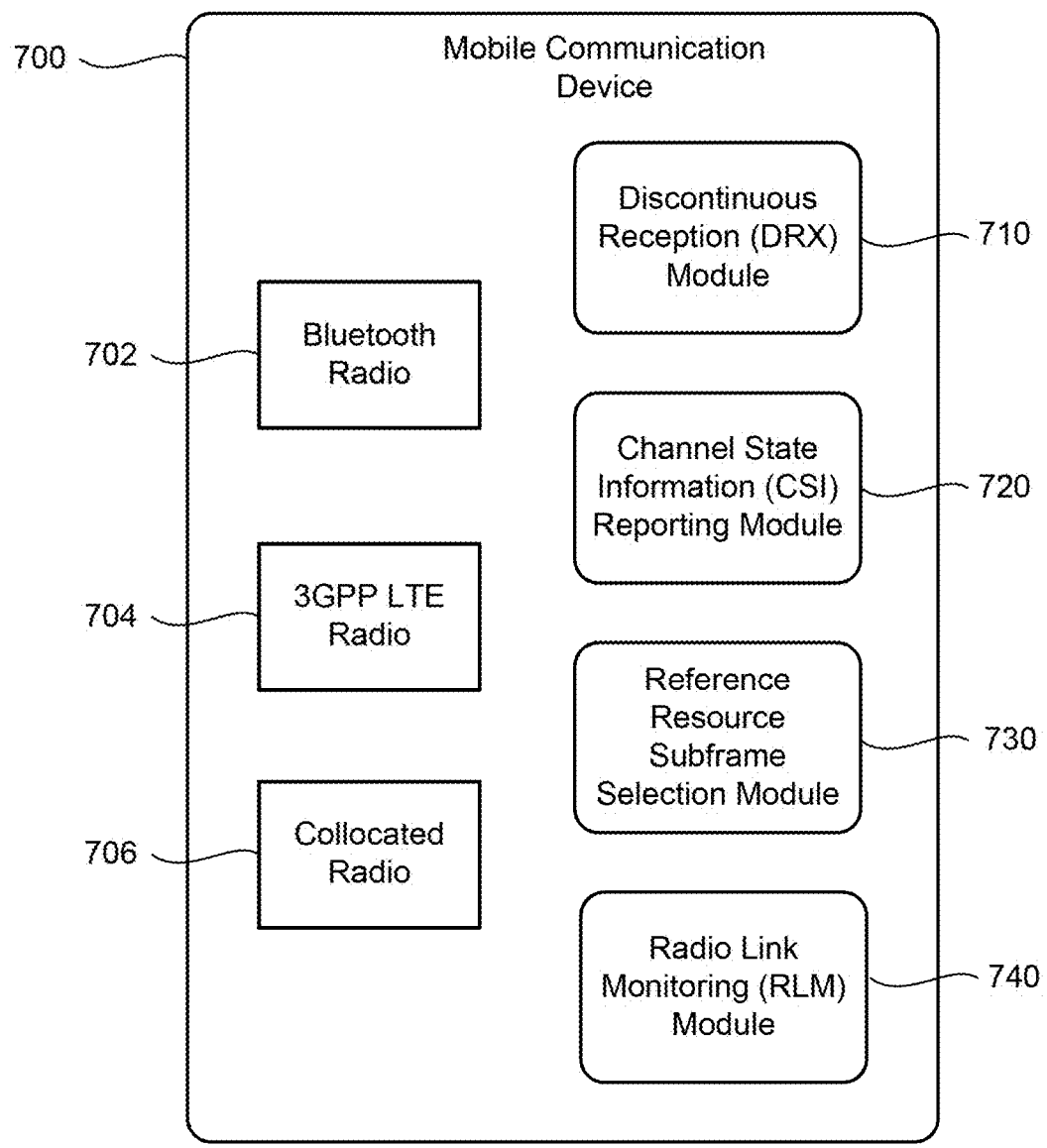
FIG. 7 illustrates a block diagram of a radio coexistence system in accordance with an example.

In another embodiment, a radio coexistence system 700 is disclosed. FIG. 7 illustrates an example block diagram of the system 700. The system 700 comprises a discontinuous reception (DRX) module 710 operable to apply DRX to a wireless wide area network (WWAN) transceiver in a user equipment (UE) with a plurality of coexisting radio transceivers. A channel state information (CSI) reporting module 720 is configured to periodically report the CSI, from the UE to the eNB, at a CSI reporting subframe. The CSI reporting subframe can be located after a long DRX cycle of the WWAN transceiver in the UE. A reference resource subframe selection module 730 is configured to select a downlink reference resource subframe relative to a position of the CSI reporting subframe to enable the downlink reference resource subframe to be received with substantially no in-device interference from the plurality of coexisting radio transceivers in the UE. A radio link monitoring (RLM) module 740 is configured to perform RLM using subframes of the WWAN receiver with substantially no in-device interference from the plurality of coexisting radio transceivers in the UE. The RLM can be performed on the WWAN radio transceiver of the UE during a scheduling period of a long DRX cycle. The system 700 can include a Bluetooth radio 702, a 3GPP LTE radio 704, and a collocated radio 706. While the DRX module, CSI reporting module, reference resource subframe selection module, and the RLM module are illustrated as being located externally to the radios in the mobile communication device, it is also possible that the modules are integrated within one or more of the radios.

In one embodiment, the plurality of coexisting radio transceivers can include at least two Radio Access Technologies (RATs), the RATs comprising: a 3GPP LTE radio transceiver, a Wireless Local Access Network (WLAN) transceiver, a Bluetooth transceiver, and a Global Navigation Satellite System (GNSS) receiver.

In one embodiment, the downlink reference resource subframe includes a CSI reference resource.

In some embodiments of the present disclosure, the CSI reported to the eNB does not substantially reduce UE throughput due to in-device interference from the plurality of coexisting radio transceivers in the UE. Furthermore, the CSI comprises at least one of a channel quality indicator (CQI), a precoding matrix indicator (PMI), and a rank indicator (RI).

In some embodiments, the CSI reporting module 720 is further configured to report the CSI, from the UE to the eNB, during a transition period from an unscheduled period to a scheduling period, wherein the unscheduled period and the scheduling period occur during a long DRX cycle of the 3GPP LTE radio transceiver. In addition, the CSI reporting module 720 is further configured to periodically report the CSI at an uplink subframe to the eNB, wherein the uplink subframe occurs at least four subframes after receiving the downlink reference resource subframe from the eNB. Furthermore, the CSI reporting module 720 is further configured to receive the downlink reference resource subframe, at the UE from the eNB, during a time period that does not correspond with a different coexisting radio transceiver in the UE transmitting an uplink subframe. In some examples, the CSI reporting module 720 is further configured to receive the downlink reference resource subframe, at the UE from the eNB, during a scheduling period of the long DRX cycle.

In some embodiments, of the present disclosure, the system 700 can include a radio link monitoring (RLM) module 740 configured to perform RLM using downlink subframes of the 3GPP LTE radio transceiver with substantially no in-device interference from the plurality of coexisting radio transceivers in the UE. In addition, the RLM module 740 is further configured to perform RLM on the 3GPP LTE radio transceiver of the UE during a scheduling period of a long DRX cycle of the DRX. The RLM module may determine a subframe with substantially no in-device interference during an unscheduled period of a long DRX cycle; and perform RLM using the subframe with substantially no in-device interference during the unscheduled period of the long DRX cycle.

In some embodiments, the present disclosure can include at least one computer readable medium having instructions stored thereon for reducing coexistence interference in a multi-radio device, the instructions when executed on a machine to cause the machine to: apply discontinuous reception (DRX) to a user equipment (UE) having a plurality of coexisting radio transceivers, wherein the DRX includes a long DRX cycle for the UE; select a cycle start offset period from a plurality of cycle start offset periods for the long DRX cycle to reduce coexistence interference between the plurality of coexisting radio transceivers in the UE; and report a channel state information (CSI), from the UE to the eNB, during the long DRX cycle of the UE and after a downlink reference resource subframe is received from the eNB, wherein the downlink reference resource subframe is received from the eNB during a period that is outside of the unscheduled period of the long DRX cycle.

In one embodiment of the computer readable medium, a location of the downlink reference resource subframe is selected as a subframe with substantially no in-device interference from the plurality of coexisting radio transceivers in the UE. Furthermore, the plurality of cycle start offset periods for the long DRX cycle include one of 2 milliseconds (ms), 5 ms, and 8 ms.

In one embodiment of the computer readable medium, the cycle start offset periods are selected to provide at least one Hybrid Automatic Repeat Request (HARQ) process reservation pattern for ensuring that each radio transceiver in the UE is not transmitting/receiving information while a different radio transceiver of the UE is receiving/transmitting information, thereby reducing coexistence interference between the plurality of radio transceivers in the UE, wherein each radio transceiver includes a different Radio Access Technology (RAT).

Figure 8:
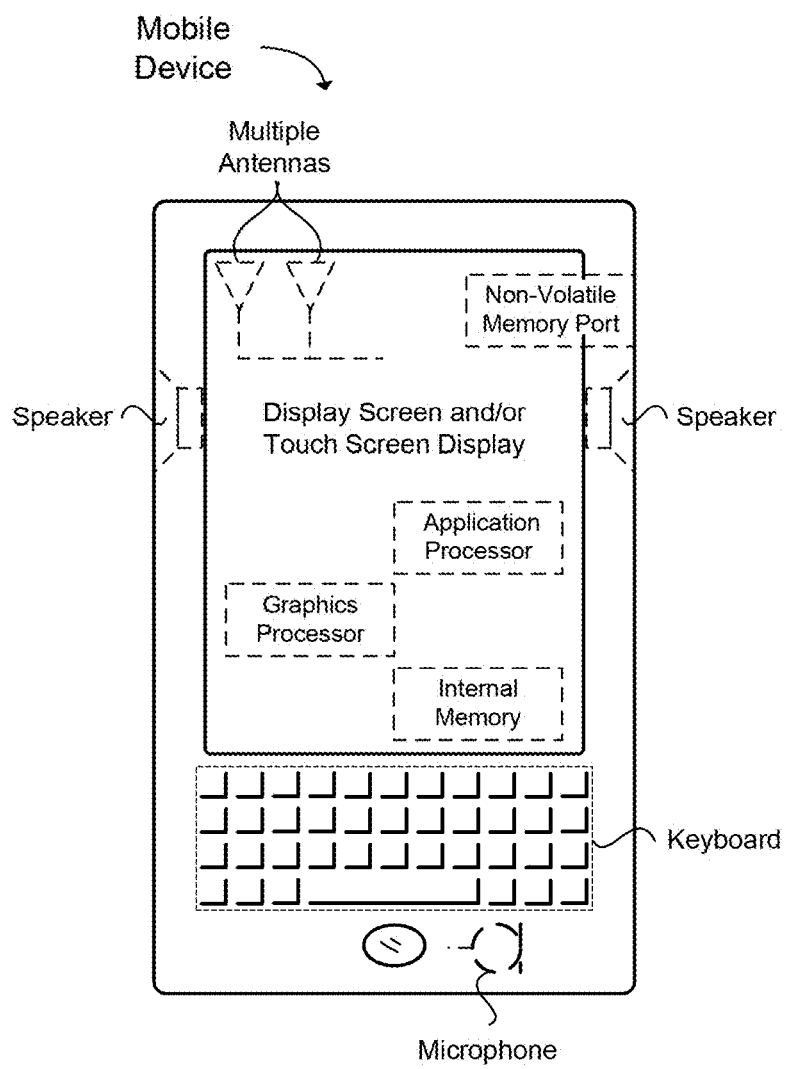
FIG. 8 illustrates a mobile wireless device in accordance with an example.

FIG. 8 provides an example illustration of a mobile communication device, such as a user equipment (UE), a mobile station (MS), a mobile wireless device, a tablet, a handset, or another type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including 3GPP LTE, Worldwide Interoperability for Microwave Access (WiMAX), High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 8 also provides an illustration of a microphone and one or more speakers that can be used for audio input and output from the mobile device. The display screen may be a liquid crystal display (LCD) screen, or other type of display screen such as a organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for reducing coexistence interference in a multi-radio device, comprising:
   receiving a discontinuous reception (DRX) configuration at the multi-radio device from an enhanced Node B (eNodeB), wherein the multi-radio device is a user equipment having a plurality of radio transceivers;
   applying the discontinuous reception (DRX) configuration to at least one of the plurality of radio transceivers in the multi-radio device, wherein the DRX includes a long DRX cycle for the at least one of the plurality of radio transceivers;
   selecting one of a 2 milliseconds (ms), 5 ms, and 8 ms cycle start offset period for the long DRX cycle to reduce coexistence interference between the plurality of radio transceivers in the multi-radio device;
   applying a 2 ms, 5 ms, or 8 ms long DRX cycle to provide additional DRX patterns to reduce in-device interference, wherein the 2 ms long DRX cycle and the 5 ms long DRX cycle provides a plurality of Hybrid Automatic Repeat Request (HARQ) reservation patterns for Long Term Evolution (LTE) Time Division Duplex (LTE-TDD) and the 8 ms long DRX cycle corresponds to eight HARQ reservation patterns for LTE Frequency Division Duplex (FDD);
   selecting a downlink channel state information (CSI) reference resource subframe with no in-device interference from the plurality of radio transceivers in the multi-radio device, wherein the downlink CSI reference resource subframe with no in-device interference that is selected is within an unscheduled period of the long DRX cycle, wherein CSI for the multi-radio device is determined using the selected downlink CSI reference resource subframe with no in-device interference to obtain an accurate CSI for the multi-radio device; and periodically reporting the CSI, from the multi-radio device to an evolved node B (eNB), at a CSI reporting subframe, wherein the CSI reporting subframe is located at least four subframes after the downlink CSI reference resource subframe such that the CSI reporting subframe is not impacted by in-device interference, wherein the CSI is reported during a transition from the unscheduled period of the long DRX cycle to a scheduling period of a subsequent long DRX cycle.

2. The method of claim 1, wherein the plurality of radio transceivers comprises a Third Generation Partnership Project Long Term Evolution (3GPP LTE) radio transceiver and a Bluetooth radio transceiver.

3. The method of claim 1, wherein the 2 ms cycle start offset period provides at least one HARQ reservation pattern to reduce the coexistence interference between the Bluetooth radio transceiver and a LTE radio transceiver communicating in LTE Time Division Duplex (LTE-TDD).

4. The method of claim 1, wherein the 5 ms cycle start offset period provides at least one HARQ reservation pattern to reduce the coexistence interference between the Bluetooth radio transceiver and a LTE radio transceiver communicating in LTE Time Division Duplex (LTE-TDD).

5. The method of claim 1, wherein the 8 ms cycle start offset period provides at least one HARQ reservation pattern to reduce the coexistence interference between the Bluetooth radio transceiver and a LTE radio transceiver communicating in LTE Frequency Division Duplex (LTE-FDD).

6. The method of claim 1, further comprising: monitoring, by the UE, the Physical Downlink Control Channel (PDCCH) during the long DRX cycle.

7. The method of claim 1, wherein selecting one of the plurality of cycle start offset periods comprises providing at least one HARQ process reservation pattern for ensuring that each of the plurality of radio transceivers of the UE is not transmitting information while a different radio transceiver of the UE is receiving information, thereby reducing coexistence interference between the plurality of radio transceivers in the UE, wherein each radio transceiver includes a different Radio Access Technology (RAT).

8. A multi-radio wireless device, comprising:

a discontinuous reception (DRX) module configured to apply DRX to a radio transceiver in the multi-radio wireless device with a plurality of coexisting radio transceivers, wherein one of a 2 milliseconds (ms), 5 ms or 8 ms cycle start offset period is selected for a long DRX cycle of the radio transceiver to reduce in-device interference between the plurality of coexisting radio transceivers, the DRX module configured to apply a 2 ms, 5 ms, or 8 ms long DRX cycle to provide additional DRX patterns to reduce in-device interference, wherein the 2 ms long DRX cycle and the 5 ms long DRX cycle provides a plurality of Hybrid Automatic Repeat Request (HARQ) reservation patterns for Long Term Evolution (LTE) Time Division Duplex (LTE-TDD) and the 8 ms long DRX cycle corresponds to eight HARQ reservation patterns for LTE Frequency Division Duplex (FDD), wherein the DRX module is stored in a digital memory device or is implemented in a hardware circuit;

a channel state information (CSI) reference resource subframe selection module configured to select a downlink CSI reference resource subframe with no in-device interference from the plurality of coexisting radio transceivers in the multi-radio wireless device, wherein the downlink CSI reference resource subframe with no in-device interference that is selected is within an unscheduled period of the long DRX cycle of the radio transceiver, wherein CSI for the multi-radio wireless device is determined using the selected downlink CSI reference resource subframe with no in-device interference to obtain an accurate CSI for the multi-radio wireless device, wherein the CSI reference resource subframe selection module is stored in a digital memory device or is implemented in a hardware circuit; and a channel state information (CSI) reporting module configured to periodically report the CSI, from the multi-radio wireless device to an evolved node B (eNB), at a CSI reporting subframe, wherein the CSI reporting subframe is located at least four subframes after the downlink CSI reference resource subframe such that the CSI reporting subframe is not impacted by in-device interference, wherein the CSI is reported during a transition from the unscheduled period of the long DRX cycle to a scheduling period of a subsequent long DRX cycle, wherein the CSI reporting module is stored in a digital memory device or is implemented in a hardware circuit.

9. The multi-radio wireless device of claim 8, wherein the plurality of coexisting radio transceivers include at least two Radio Access Technologies (RATs), the RATs comprising: a Third Generation Partnership Project Long Term Evolution (3GPP LTE) Release 8, 9, 10 or 11 radio transceiver, a Wireless Local Access Network (WLAN) transceiver, a Bluetooth transceiver, and a Global Navigation Satellite System (GNSS) receiver.

10. The multi-radio wireless device of claim 8, wherein the CSI reported to the eNB does not reduce throughput due to in-device interference in the downlink CSI reference resource subframe from the plurality of coexisting radio transceivers in the multi-radio wireless device.

11. The multi-radio wireless device of claim 8, wherein the CSI comprises at least one of a channel quality indicator (CQI), a precoding matrix indicator (PMI), and a rank indicator (RI).

12. The multi-radio wireless device of claim 8, wherein the CSI reporting module is further configured to periodically report the CSI to the eNB during an uplink subframe, wherein the uplink subframe occurs at least four subframes after the downlink CSI reference resource subframe.

13. The multi-radio wireless device of claim 8, wherein the downlink CSI reference resource subframe is within a time period that does not correspond with a different coexisting radio transceiver in the multi-radio wireless device transmitting during an uplink subframe.

14. The multi-radio wireless device of claim 8, wherein the downlink CSI reference resource subframe is within a scheduling period of the long DRX cycle of the radio transceiver.

* * * * *